United States Patent

[11] 3,587,851

[72] Inventor  Ingvar G. Anderson
              Wheaton, Ill.
[21] Appl. No  787,916
[22] Filed     Dec. 30, 1968
[45] Patented  June 28, 1971
[73] Assignee  Metropolitan Waste Conversion
              Corporation

[54] RAG SEPARATION EQUIPMENT
     6 Claims, 3 Drawing Figs.
[52] U.S. Cl.................................. 209/74,
                                              209/108
[51] Int. Cl................................. B07c 3/02
[50] Field of Search......................... 209/72, 72
                            (PH), 74, 78, 108; 271/74

[56]            References Cited
            UNITED STATES PATENTS
1,328,733   1/1920   Harriss.................. 209/72UX
1,827,753  10/1931   Kinney................... 271/74

2,843,264   7/1958   Pfister................... 209/108

Primary Examiner—Richard A. Schacher
Attorney—Bair, Freeman and Molinare

ABSTRACT: Apparatus for removing waste materials including rags from an assortment of waste materials being conveyed past a rag removal station and consisting of a rotatable cylinder contacting the material due to its own weight and driven by movement of the conveying means under the rotatable cylinder. The cylinder has a perforated surface in contact with the materials and means is provided in one portion of the surface adjacent the conveying means to provide subatmospheric pressure or suction through the perforations thereof which draws the rags and similar materials into contact with the surface of the cylinder. To remove the adhered rags from the cylinder another section thereof is subjected to atmospheric pressure as opposed to subatmospheric pressure whereby the rags are released from the surface of the rotatable cylinder and may fall into a take-away conveyor or the like to remove them from the vicinity of the conveying means and dispose of them by further processing.

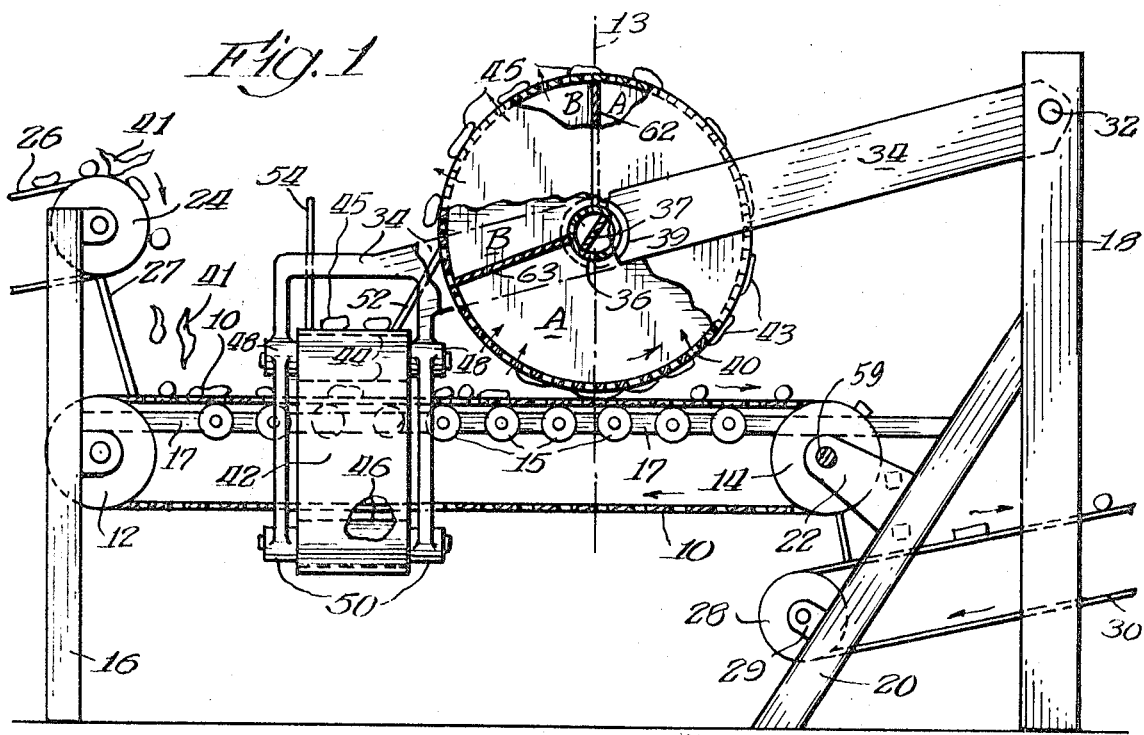

3,587,851

1

RAG SEPARATION EQUIPMENT

BACKGROUND OF THE INVENTION

Various methods and apparatus or equipment are provided for the treatment of refuse such as household and industrial waste, garbage and the like. In one such apparatus the waste materials are reduced in a primary grinder whereupon by mechanical screeners, manual picking, magnetic separators and the like, many of the waste materials may be removed leaving only such materials as nonferrous metals, plastic containers, film plastic, rags and the like. The nonferrous metals, such as aluminum or the like, can be removed by manual picking and the plastic containers by apparatus of the kind shown in the copending application of Fyfe and Brown, Ser. No. 765,247, filed Oct. 4, 1968, leaving film plastic, rags and the like and other miscellaneous materials.

One object of my present invention is to provide equipment which is effective to receive waste materials including rags and the like and other or remaining materials from waste separation equipment and to convey such materials past a rag removal station of the apparatus.

Another object is to provide rag removal apparatus in the form of a removal element having a movable surface which is progressively engageable with the waste materials on the conveyor and is perforated and subjected to subatmospheric pressure to cause rags, film plastic and the like, to adhere thereto whereupon these materials are carried on the movable surface away from the conveying means.

Another object is to provide atmospheric pressure for another portion of the movable surface to release the rags, etc. therefrom whereupon they may drop into a take-away conveyor or the like.

Still another object is to provide the perforated surface in the form of a cylinder and the cylinder of such weight that by mounting it for free up-and-down movement, gravity holds the cylinder in contact with the waste materials on the conveyor with sufficient pressure to effect the desired contact of the perforated cylinder with the materials to flatten them against the cylinder surface so that suction can efficiently hold them thereagainst for removal from the conveying means.

A further object is to provide means for rotating the surface of the cylinder at substantially the same speed as the conveying means, utilizing the movement of the conveying means to effect such rotation due to the weight of the cylinder imposed on the conveying means.

Still a further object is to provide for removal of the rags and similar materials from the vicinity of the cylinder and the conveying means for disposing thereof.

BRIEF SUMMARY OF THE INVENTION

Equipment is provided which has a waste materials conveyor to convey miscellaneous waste materials including rags and the like past a rag removal station of the equipment. A heavy perforated cylinder mounted to float vertically rests on the material being conveyed and the rags, etc. are removed from the conveying means by applying subatmospheric pressure to the lower inside part of the cylinder so that the rags adhere to the surface thereof whereupon they may be released from another part of the cylinder spaced from the conveyor and removed from the vicinity of the cylinder by release of the subatmospheric pressure, thereby producing a discharge from the waste materials conveyor which is free of rags and similar materials. The remaining materials may then be treated in accordance with their composition, being ground and/or screened and/or composted and/or incinerated, etc.

BRIEF DESCRIPTION OF THE DRAWINGS

FIG. 1 is a semidiagrammatic vertical side elevation and partially sectional view of rag separation equipment embodying my invention;

FIG. 2 is a diagrammatic perspective view thereof showing only the essential operating elements thereof; and FIG. 3 is a pneumatic diagram of our equipment.

2

DESCRIPTION OF THE PREFERRED EMBODIMENT

On the accompanying drawings I have used the reference numeral 10 to indicate a waste materials conveyor suitable for conveying waste materials including rags, thermoplastic films, and the like, as well as other shapes of thermoplastic materials past a rag removal station indicated by the centerline 13. The conveyor 10 may be formed of metal slats or the like and is shown trained around rollers 12 and 14. The roller 12 may be journaled on frame elements 16 at the intake end of the conveyor 10 whereas at the outgoing end thereof the roller 14 may be journaled in brackets 22 supported by frame elements 18 and 20. Preferably a series of freewheeling supporting rolls 15 are provided journaled on frame elements 17 to prevent undesirable sagging of the upper conveying stretch of the conveyor 10.

A roller 24 is also journaled on the frame element 16 and a delivery conveyor 26 is trained therearound for delivering miscellaneous waste materials to the materials conveyor 10 from, for instance, the primary grinder of the waste separation equipment above referred to after certain screening and other separating operations have been performed leaving certain materials including rags and the like to be separated from the miscellaneous materials. A baffle wall 27 prevents any materials from falling off the conveyor 10 over the roller 12.

At the outgoing end of the conveyor 10 a roller 28 is journaled on brackets 29 of the frame elements 20 and remaining materials conveyor 30 is trained therearound for receiving the materials (with the exception of rags 45 which have been removed) from the conveyor 10 and transferring them to further processing apparatus.

The frame elements 18 carry a pivot shaft 32 on which supporting arms 34 are pivoted and these arms journal a stationary tube 36. A cylindrical roller 38 has hubs 39 mounted for free rotation on the tube 36 and constitutes the rag removal element of our apparatus. As shown partially in section in FIG. 1, the roller 38 has a cylindrical surface which is perforated, the perforations being indicated at 40.

A rag take-away conveyor 42 is shown trained around a pair of upper rollers 44 and a pair of lower rollers 46 for which bearings 48 and 50 respectively are provided. The bearings 48 and 50 are carried by extensions of the arms 34 beyond the tube 36 as clearly shown in FIG. 1 to maintain a constant relationship between a conveyor sideboard 52 carried by the arms 34. A barrier wall 54 is also carried by the arms 34.

The foregoing described equipment operates as illustrated in FIG. 1, the conveyor 10 being driven as by a motor 56 and a stepdown gearing unit 58 in FIG. 2, the conveyors 26 and 30 being also driven by the same motor if desired. Accordingly the various elements of the equipment move in the direction of the indicating arrows throughout the drawing, the conveyor 10 moving miscellaneous materials including rags 41 and the like toward the right in FIG. 1 under the removal roller 38.

This roller as mentioned has a perforated surface and in order to cause the rags, etc. to adhere thereto as at 43, a portion thereof may be subjected to subatmospheric pressure or suction, preferably all but about the upper left quarter in FIG. 1 represented by volume A, while that quarter just mentioned (represented by volume B) is subjected to atmospheric pressure. For this purpose the tube 36 is provided with vanelike walls 62 and 63 so that the larger volume A inside the drum may be subjected to subatmospheric pressure and the smaller volume B to atmospheric pressure. This may be accomplished as shown in FIG. 3 by an intake 64 connected to the tube 36 and leading to a blower or the like 70 which has an outlet 66 to atmosphere. the tube 36 has a partition 37 to separate the part of the tube leading to the chamber A, from another part thereof leading from the chamber B, the first part communicating at 68 in FIG. 3 with atmosphere. Accordingly, rags 41 are picked up (43) from the conveyor 10 in response to the subatmospheric pressure in chamber A and released (45) above the conveyor 42 because of the absence of suction (replaced by atmospheric pressure) in chamber B. The cylinder 38 is rotated counterclockwise by its contact with the materials on the conveyor 10 including the rags 41 which are later released as at 45 because of the pressure in chamber B, and are deposited on the take-away conveyor 42 between the sideboard 52 and the barrier wall 54.

By mounting the cylindrical roller 38 for free vertical floating action (due to the pivoting of the supporting arms 34 on the shaft 32), and making the roller of considerable weight, adequate pressure is provided for flattening the rags 41 on the conveyor 10 and thereby conditioning them for adherence at 43 to the perforated surface of the cylindrical roller. Due to such adherence they are separated from the other waste materials which are passed on by the conveyor 10 to the conveyor 30. The rags 45 released because of atmospheric pressure in the chamber B are removed from the cylinder 38 by falling down the sideboard 52 and into the take-away conveyor 42. Since this conveyor as well as the conveyor sideboard 52 are carried by the pivoted supporting arms 34, they are always in the same relationship to the surface of the roller 38 for effective prevention of any of the rags 45 remaining on the cylinder 38 and passing by the sideboard 52.

From the foregoing specification it is obvious that relatively simple equipment is provided for effectively separating rags and similar materials from other waste materials by the expedient of a perforated cylinder with different portions thereof subject to subatmospheric and atmospheric pressures for removing rags and the like from other waste materials and for removing the rags that are released from the cylinder to a position remote from the conveying means and the rag removal cylinder for further processing.

I claim:

1. An improved rag separation apparatus or removing rags and the like from other types of refuse, such as household and industrial waste materials, garbage and the like, comprising:

perforated belt means for conveying refuse including, as a part thereof, rags and the like along its generally horizontal upper surface;

a cylinder having a perforated peripheral surface and being adapted to rotate about generally horizontal axis substantially parallel to said upper surface of the belt means; the cylinder being disposed and supported relative to the belt means so that at all times, due to the weight of the cylinder, a portion of the outer peripheral surface of the cylinder rests on and is in contact with a portion of said upper surface of the belt means and so that the cylinder is rotated by the belt means in the same direction and at substantially the same speed as the direction of movement and speed of the belt means;

means cooperating with the interior of the cylinder and with, at least, a segment of the outer peripheral surface of the cylinder, including said portion thereof, for causing atmosphere to be drawn into the interior of the cylinder through the perforations in the peripheral surface of the cylinder so that rags passing between said portion of the peripheral surface of the cylinder and said upper surface of the belt means adhere to said peripheral surface along the segment thereof solely by means of atmospheric pressure whereby the rags are separated from the rest of the refuse being conveyed the belt means; and removal means positioned adjacent to the peripheral surface of the cylinder for removing the separated rags from adjacent to the peripheral surface of the cylinder at a point remote from said portion of said peripheral surface and for preventing the separated rags from returning to said upper surface of the belt means.

2. The improved rag separation apparatus described in claim 1, wherein the interior of the cylinder is provided with stationary vanes to isolate said segment of the peripheral surface of the cylinder from the remaining part of the peripheral surface of the cylinder; and wherein the removal means is positioned adjacent to said remaining part of the peripheral surface of the cylinder.

3. The improved rag separation apparatus described in claim 2, wherein the removal means includes means for introducing atmospheric pressure into the interior of the cylinder adjacent to said remaining part of the peripheral surface of the cylinder.

4. The improved rag separation apparatus described in claim 3, wherein the removal means includes a second belt means for conveying the separated rags away from the cylinder.

5. The improved rag separation apparatus described in claim 1, wherein means are provided to permit upward movement of the cylinder, with respect to the belt means, in accordance with the refuse passing between said portion of the peripheral surface of the cylinder and said portion of said upper surface of the belt means.

6. The improved rag separation apparatus described in claim 1 wherein the removal means includes a second belt means for conveying the separated rags away from the cylinder.